United States Patent Office 3,634,436
Patented Jan. 11, 1972

3,634,436
POLYHALOPYRIDYLTHIO-, SULFINYL- AND SULFONYLALKYLNITRILES
Penelope B. Domenico, Danville, Calif., assignor to The Dow Chemical Company, Midland, Mich.
No Drawing. Filed Sept. 26, 1969, Ser. No. 861,457
Int. Cl. C07d 31/50
U.S. Cl. 260—294.8 F                9 Claims

ABSTRACT OF THE DISCLOSURE

The present disclosure is directed to polyhalopyridylthio-, sulfinyl- and sulfonylalkylnitriles corresponding to the formula

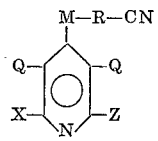

wherein M represents sulfide (—S—), sulfinyl

or sulfonyl

R is an alkyl or monohalo substituted alkyl radical having 1 or 2 carbon atoms and further characterized in that when R has 2 carbon atoms, one of the carbon atoms can have a methyl group attached thereto; X represents chlorine, bromine or fluorine; Z represents hydrogen, chlorine, bromine or fluorine, cyano, carboxy (COOH) or the salts or esters thereof or carbamoyl (CONH$_2$); Q represents chlorine or bromine with the proviso that when Q is bromine, X is bromine; the preparation and use of these compounds as pesticides is also taught.

SUMMARY OF THE INVENTION

The present invention is directed to polyhalopyridylthio-, sulfinyl- and sulfonylalkylnitriles corresponding to the formula

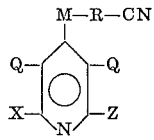

In this and succeeding formulae, M represents sulfide (—S—), sulfinyl

or sulfonyl

R is an alkyl or monohalo substituted alkyl radical having 1 or 2 carbon atoms and further characterized in that when R has 2 carbon atoms, one of the carbon atoms can have a methyl group attached thereto; X represents chlorine, bromine or fluorine; Z represents hydrogen, chlorine, bromine, fluorine, cyano, carboxyl (COOH) or the salts or esters thereof or carbamoyl (CONH$_2$); Q represents chlorine or bromine with the proviso that when Q is bromine, X is bromine.

For convenience, those compounds of the present invention wherein M represents the sulfide group (—S—) are identified as thioalkylnitriles; those compounds wherein M represents the sulfinyl group

are identified as sulfinylalkylnitriles and those compounds wherein M represents the sulfonyl group

are identified as sulfonylalkylnitriles.

The nitriles of the present invention are crystalline solids which are of low solubility in water and of moderate solubility in common organic solvents. These nitriles are useful as pesticides in the control of various pests.

The term "halo" as employed in the present specification and claims represents chloro, fluoro or bromo.

The term "salt" as employed in the present specification and claims designates the reaction products of basic compounds with the acid functional group —COOH. Such salts can be represented by the formula —COOMe wherein Me represents ammonium, the alkali metals such as sodium, lithium, potassium, cesium or rubidium, the alkaline earth metals such as calcium, barium and strontium and the heavy metals including antimony, bismuth, cadmium, cerium, chromium, cobalt, copper and other metals having a density of above 4.

The term "esters" as employed in the present specification and claims designates reaction products of alcohols with the acid functional group —COOH. Such esters can be represented by the formula —COOR$_2$ wherein R$_2$ represents lower alkyl of 1 to 4 carbon atoms.

The new compounds of the present invention are prepared by a variety of methods. The thioalkylnitriles are prepared by reacting the alkali metal salt of a polyhalomercaptopyridine of the formula

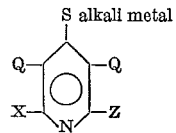

wherein the term "alkali metal" is as hereinbefore defined, with a haloalkylnitrile of the formula

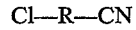

in the presence of an inert organic solvent such as methanol, ethanol, isopropanol, dimethylsulfoxide, dimethoxyethane or other conventionally employed solvent. The reaction proceeds readily under ambient atmospheric pressure at temperatures of from about 25° to about 100° C. with the reflux temperature of the mixture being the preferable temperature employed. The alkali metal salt of the polyhalomercaptopyridine and the chloroalkylnitrile are admixed in any order or fashion in one of the inert organic solvents listed above. The amount of the reactants to be employed is not critical, some of the product being formed when employing any proportions. The reaction consumes the reactants, however, in the ratio of one mole of the alkali metal salt of the polyhalomercaptopyridine per mole of the chloroalkylnitrile and the employment of such proportions is preferred. After the reaction period is complete, the reaction mixture is filtered to remove any alkali metal halide present and the solvent is stripped off under vacuum leaving the solid product as a residue, which is then dried.

An alternative procedure for preparing the thioalkylnitriles involves the reaction of a halopyridyl mercaptan of the formula

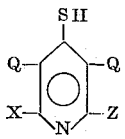

with an olefinic nitrile of the formula

The reaction is carried out in an inert organic solvent as reaction medium and takes place readily at temperatures between about 25° and 100° C. The proportions of the reactants to be employed are not critical, some of the desired product being formed upon contacting the reactants in any proportions. However, the reaction consumes the reactants in equimolar proportions and the use of substantially equimolar proportions is preferred. In carrying out the reaction, the reactants are contacted in any order or fashion in the liquid reaction medium. Following contacting of the reactants, the reaction mixture is maintained at a temperature within the reaction temperature range for a short period of time. Thereafter, the reaction mixture is subjected to a stripping step to remove the solvent and obtain the product as a crude residue.

A procedure for preparing thiohaloalkylnitriles involves the reaction of a halopyridyl sulfenyl chloride (or bromide) of the formula

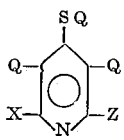

wherein Q is as hereinbefore defined, with an olefinic nitrile of the formula

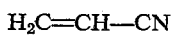

The reaction is carried out in any inert organic solvent as reaction medium and takes place readily at temperatures between about 25° and about 100° C. The proportions of the reactants to be employed are not critical, some of the desired product being formed upon contacting the reactants in any proportions. However, the reaction consumes the reactants in equimolar proportions and the use of substantially equimolar proportions is preferred. In carrying out the reaction, the reactants are contacted in any order or fashion in the liquid reaction medium. Following contacting of the reactants, the reaction mixture is maintained at a temperature within the reaction temperature range for a short period of time. Thereafter, the reaction mixture is subjected to a stripping step to remove the solvent and obtain the product as a crude residue.

The ammonia, alkali metal, alkaline earth metal and heavy metal salts of the present invention are prepared by conventional technique whereby the carboxyl group of a carboxy substituted pyridyl alkyl nitrile is reacted with a hydroxide, oxide, carbonate or bicarbonate of the above grouped metals, or, in many cases the metal itself.

The alkyl esters of the present invention are prepared by conventional technique whereby the carboxyl group of a carboxy substituted pyridyl alkyl nitrile is reacted with an alkyl alcohol.

The sulfinyl alkylnitriles and the sulfonylalkylnitriles of the present invention are prepared by reacting the thioalkylnitriles with an oxidizing agent. The oxidation of any of the thioalkylnitriles results, at least partially, in the preparation of the corresponding sulfinylalkylnitrile compound.

The oxidation of one molecule of the thioalkylnitrile to the corresponding sulfinylalkylnitrile or the oxidation of one molecule of a sulfinylalkylnitrile to the corresponding sulfonylalkylnitrile requires one atom of oxygen for each sulfur atom. The oxidation of the thioalkylnitrile directly to the corresponding sulfonylalkylnitrile, on the other hand, consumes two atoms of oxygen for each sulfur atom in each molecules of thioalkylnitrile so oxidized. In carrying out the various oxidation reactions to prepare the compounds of the present invention, it is preferable to employ the oxidizing agent in minor quantities which will provide oxygen in the stoichiometric quantities consumed in the conversion. In some instances, the use of a slight excess of the oxidizing agent is preferred. However, the use of the reactants in any particular proportions is not critical, some of the desired product being formed upon combining the reactants in any proportions.

In many instances, this compound, if subjected to continuing oxidative conditions, is further oxidized to the corresponding sulfonylalkylnitrile compound. In some instances, the oxidation may proceed to the sulfonylalkylnitrile so rapidly that it is not practical to isolate the sulfinyl compound. Representative oxidizing agents for the production of the sulfinylalkylnitrile compounds include nitric acid and hydrogen peroxide and representative oxidizing agents to be employed in the preparation of the sulfonyl compounds include fuming nitric acid, nitric hydrogen peroxide, and the peracids such as peroxy benzoic acid.

Hydrogen peroxide, and conveniently an aqueous solution thereof, can be employed as the oxidizing agent in the production of the sulfinyl and sulfonyl derivatives of the present invention. In such embodiments, the reaction is carried out in the presence of a liquid reaction media, such as glacial acetic acid, a mixture of acetic acid and acetic anhydride or trifluoro acetic acid. In a preferred procedure, the acetic acid-anhydride mixture is employed as the liquid reaction medium. The reaction takes place at temperatures of from about 25° to about 120° C. In a convenient method, the reaction is carried out at the boiling temperature and under reflux. In carrying out the reaction, the reactants are contacted in any order or fashion, and preferably in amounts stoichiometric for the preparation of the desired product. The reaction mixture is then maintained at a temperature within the reaction temperature range for a short period of time. Following the reaction period, the sulfinyl- or sulfonylalkylnitrile product can be separated by conventional procedures such as evaporation of the reaction medium to obtain the product as a crude residue. In an alternative procedure, the reaction mixture is washed with cold water and is thereafter filtered to obtain the crystalline product.

Nitric acid is conveniently employed to oxidize the thioalkylnitrile starting materials to the corresponding sulfinylalkylnitriles. The reaction can be carried out in the presence of a haloalkane as reaction medium such as carbon tetrachloride, methylene dichloride, ethylene dibromide, etc. In a preferred procedure, excess nitric acid is employed as reaction medium. The reaction proceeds at temperatures between about 15° C. and about 120° C. Preferably the reaction is carried out under reflux conditions at temperatures of from 40° C. to 85° C. and requires only a short period of time for completion. Conveniently, the reactants are mixed and the temperature is allowed to rise to the desired temperature and maintained at or about this temperature during the refluxing.

The contacting of the reagents and separation and isolation of the desired product are all as previously described.

An additional procedure for preparing the sulfonylhaloalkylnitriles involves the reaction of a halopyridyl sulfonyl chloride of the formula

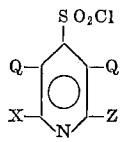

with an olefinic nitrile of the formula

The reaction is carried out in an inert organic solvent as reaction medium and takes place readily at temperatures between about 25° and about 100° C. The proportions of the reactants to be employed are not critical, some of the desired product being formed upon contacting the reactants in any proportions. However, the reaction consumes the reactants in equimolar proportions and the use of substantially equimolar proportions is preferred. In carrying out the reaction, the reactants are contacted in any order or fashion in the liquid reaction medium. Following contacting of the reactor the reaction mixture is maintained at a temperature within the reaction temperature range for a short period of time. Thereafter, the reaction mixture is subjected to a stripping step to remove the solvent and obtain the product as a crude residue.

DESCRIPTION OF PREFERRED EMBODIMENTS

The following examples illustrate the present invention and the manner by which it can be practiced but, as such, should not be construed as limitations upon the overall scope of the same.

EXAMPLE 1

[(2,3,5,6-tetrachloro-4-pyridyl)thio]acetonitrile

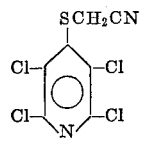

To an agitated solution containing 7.0 grams (0.08 mole) of chloroacetonitrile and 200 milliliters of 28 percent absolute ethanol is added 2 grams (0.07 mole) of the sodium salt of 2,3,5,6 - tetrachloro-4-pyridinethiol. The mixture is refluxed for 3 hours at ambient atmospheric pressure and a temperature of 78.5° C. The hot solution is filtered to remove any sodium chloride formed and stripped of solvent under vacuum. The resulting [(2,3,5,6-tetrachloro - 4 - pyridyl)thio]acetonitrile product is recovered as a residue and dried and is obtained in a yield of 90 percent of theoretical. The product has a melting point of 134.5° C. and is found by analysis to have carbon, hydrogen, chlorine, nitrogen and sulfur contents of 29.23, 0.59, 48.90, 10.11 and 10.98 percent, respectively, as compared with the theoretical contents of 29.18, 0.72, 49.20, 9.72 and 11.12 percent, respectively, calculated for the above named structure.

EXAMPLE 2

[(2,3,5-trichloro-4-pyridyl)thio]acetonitrile

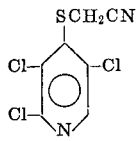

To an agitated solution containing 1.7 grams (0.02 mole) of chloroacetonitrile and 50 milliliters of 28 percent absolute ethanol is added dropwise 5 grams (0.02 mole) of the sodium salt of 2,3,5-tetrachloro-4-pyridinethiol at ambient room temperature. The mixture is refluxed for 2 hours at ambient atmospheric pressure and a temperature of 78.5° C. The hot solution is filtered to remove any sodium chloride formed and cooled and the solid [(2,3,5 - trichloro - 4 - pyridyl)thio]acetonitrile product is removed by filtration and dried. The product is recovered in a yield of 3 grams and is found to have a melting point of 75° C. The product is found to have carbon, hydrogen, chlorine, nitrogen and sulfur contents of 33.2, 1.14, 41.78, 11.05 and 12.88 percent, respectively, as compared with the theoretical contents of 33.2, 1.19, 41.9, 11.08 and 12.65 percent, respectively, calculated for the above named structure.

EXAMPLE 3

3-[(2,3,5,6-tetrachloro-4-pyridyl)thio]propionitrile

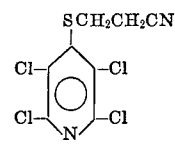

To an agitated solution containing 5 grams (0.02 mole) of tetrachloro-4-mercaptopyridine, 25 milliliters of dimethylformamide and 3 drops of tetraethanol ammonium hydroxide at 60° C. is added 1.2 grams (0.02 mole) of acrylonitrile. The temperature of the mixture is raised to 100° C. and held for 2 hours. The reaction mixture is added to water with stirring and the solid 3-[2,3,5,6-tetrachloro-4-pyridyl)thio]propionitrile product is extracted with benzene, dried with sodium sulfate, and crystallized from a benzene-hexane mixture. The product is recovered in a yield of 64.7 percent of theoretical. It has a melting point of 110.5° C. and is found by analysis to have carbon, hydrogen, chlorine, nitrogen and sulfur contents of 32.02, 1.62, 46.98, 9.16 and 10.82 percent, respectively, as compared with the theoretical contents of 31.80, 1.33, 47.00, 9.27 and 10.60 percent, respectively, calculated for the above named structure.

EXAMPLE 4

[(2,3,5,6-tetrachloro-4-pyridyl)sulfinyl]acetonitrile

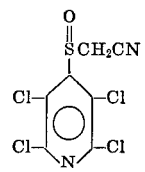

To an agitated solution containing 8 grams (0.03 mole) of [(2,3,5,6-tetrachloro-4-pyridyl)thio]acetonitrile (prepared as in Example 1), 16 milliliters of acetic acid and 16 milliliters of acetic anhydride is slowly added 12.58 grams of 30 percent hydrogen peroxide. The temperature of the mixture is allowed to rise, exothermically, to 80° C. after which the temperature is raised to 105° C. and the mixture refluxed at this temperature for 20 minutes. The reaction mixture is cooled and poured into ice water. This mixture is filtered to remove the [(2,3,5,6-tetrachloro-4-pyridyl)sulfinyl]acetonitrile product which is recrystallized from hexane. The product is recovered in a yield of 73.2 percent of theoretical and has a melting point of 135.5° C. The product is also found by analysis to have carbon, hydrogen, chlorine, nitrogen and sulfur contents of 27.56, 0.61, 46.38, 9.32 and 10.42 percent, respectively, as compared with the theoretical contents of 27.68, 0.66, 4.60, 9.21 and 10.52 percent, respectively, calculated for the named structure.

EXAMPLE 5

[(2,3,5,6-tetrachloro-4-pyridyl)sulfonyl]acetonitrile

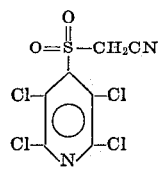

To an agitated solution containing 8 grams (0.03) of [(2,3,5,6-tetrachloro-4-pyridyl)thio]acetonitrile, 20 milliliters of acetic acid and 16 milliliters of acetic anhydride is added slowly 12.58 grams of 30 percent hydrogen peroxide over a period of 45 minutes. The mixture is stirred until the temperature reaches 70° C. (about one hour). The temperature is raised to 105° C. and the mixture refluxed for 30 minutes. An additional 6 grams of 30 percent hydrogen peroxide is added and the mixture is refluxed an additional 20 minutes. The solution is cooled and poured over ice and the [(2,3,5,6-tetrachloro-4-pyridyl)sulfonyl]acetonitrile product is removed by filtration and dried as a solution in benzene over sodium sulfate. The solvent is removed and the product recrystallized from hexane. The product is recovered in a yield of 60 percent of theoretical and has a melting point of 121° C. It is found by analysis to have carbon, hydrogen, chlorine, nitrogen and sulfur contents of 25.73, 1.37, 43.92, 8.94 and 10.02 percent, respectively, as compared with the theoretical contents of 26.30, 0.63, 44.4, 8.77 and 10.01 percent, respectively, calculated for the named structure.

EXAMPLE 6

3-[(2,3,5,6-tetrachloro-4-pyridyl)sulfonyl]propionitrile

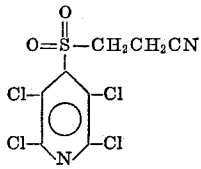

To an agitated solution containing 2 grams (0.007 mole) of 3-[(2,3,5,6-tetrachloro - 4 - pyridyl)thio]propionitrile (prepared as in Example 3), 5 milliliters of acetic acid and 5 milliliters of acetic anhydride is slowly added 3 grams of 30 percent hydrogen peroxide. The reaction mixture is stirred until the temperature rises to 50° C. exothermically and the mixture is raised to 109° C. and refluxed for 20 minutes. The reaction mixture is poured over ice and the solid 3-[(2,3,5,6-tetrachloro-4-pyridyl)sulfonyl]propionitrile product is recovered by filtration, dried and crystallized from hexane. The product is obtained in a yield of 45.5 percent of theoretical, has a melting point of 151° C. and is found by analysis to have carbon, hydrogen, chlorine, nitrogen and sulfur contents of 28.89, 1.32, 42.42, 8.52 and 9.70 percent, respectively, as compared with the theoretical contents of 28.71, 1.20, 42.40, 8.40 and 9.59 percent, respectively, calculated for the named structure.

The following compounds of the present invention are prepared in accordance with the methods herein set forth:

3-[(2,3,5-trichloro-4-pyridyl)thio]propionitrile (molecular weight 266) by the reaction of 2,3,5-trichloro-4-mercapto pyridine and acrylonitrile in dimethyl formamide.

[(2,3,5,6-tetrabromo - 4 - pyridyl)sulfonyl]acetonitrile (molecular weight 498) by the reaction of [(2,3,5,6-tetrabromo-4-pyridyl)thio]acetonitrile and nitric acid.

3-[2,6-difluoro - 3,5 - dichloro-4-pyridyl)sulfinyl]propionitrile (molecular weight 284) by the reaction of 3-[(2,6-difluoro-3,5-dichloro - 4 - pyridyl)thio]propionitrile and hydrogen peroxide.

3-[(2,3,5,6-tetrachloro - 4 - pyridyl)sulfinyl]propionitrile (molecular weight 316) by the reaction of 3-[(2,3,5,6-tetrachloro-4-pyridyl)thio]propionitrile and nitric acid.

3-[(2,3,6-tribromo - 4 - pyridyl)sulfonyl]propionitrile (molecular weight 417) by the reaction of potassium permanganate and 3-[(2,3,6-tribromo-4-pyridyl)thio]propionitrile.

[(2,3,6-trichloro-4-pyridyl)sulfonyl] acetonitrile (molecular weight 284) by the reaction of [(2,3,6-trichloro-4-pyridyl)sulfinyl]acetonitrile and hydrogen peroxide.

[(2 - fluoro - 3,5,6-trichloro-4-pyridyl)sulfinyl]acetonitrile (molecular weight 286) by the reaction of[(2-fluoro-3,5,6-trichloro-4-pyridyl)thio]acetonitrile and nitric acid.

3 - [(2,3,5,6-tetrabromo-4-pyridyl)sulfinyl]propionitrile (molecular weight 512) by the reaction of 3-[(2,3,5,6-tetrabromo-4-pyridyl)thio]propionitrile and hydrogen peroxide.

2 - chloro - 3-[(2-cyano-3,5,6-trichloro-4-pyridyl)-thio] propionitrile (molecular weight~327).

2 - chloro - 3-[(2-cyano-3,5,6-trichloro-4-pyridyl)-sulfinyl]propionitrile (molecular weight~359).

2 - methyl - 3 - [(2 - carboxy-3,5,6-tribromo-4-pyridyl)-thio]propionitrile (molecular weight~458).

3 - [(2 - carbamoyl-3,5,6-trichloro-4-pyridyl)thio]propionitrile (molecular weight~311).

3 - [(2 - carboxy-3,5-dibromo-6-chloro-4-pyridyl)-thio] propionitrile (molecular weight~400).

3 - [(2-methoxycarbonyl-3,5,6-trichloro-4-pyridyl)-sulfinyl]propionitrile (molecular weight~326).

2 - chloro-3-methyl-3-[(2-butoxycarbonyl-3,5,6-trichloro-4-pyridyl)thio]propionitrile (molecular weight~416).

3 - [(2-carboxy-3,5,6-trichloro-4-pyridyl)sulfinyl]propionitrile, ammonium salt (molecular weight~329).

3 - methyl - 3-[(2-carboxy-3,5,6-trichloro-4-pyridyl)sulfonyl]propionitrile, cadmium salt (molecular weight ~469).

[(2 - carboxy - 3,5,6-trichloro-4-pyridyl)sulfonyl]acetonitrile, sodium salt (molecular weight~352).

2 - bromo-3-[(2,3,5,6-tetrabromo-4-pyridyl)thio]propionitrile (molecular weight~559).

In accordance with the present invention, it has been discovered that the thio-, sulfinyl- and sulfonyl-alkylnitrile compounds can be employed as pesticides for the control of many bacterial, terrestrial and aquatic plants, fungal and insect pests. A particular advantage of the present invention is that the compounds are of low toxicity to mammals and to most higher plants and can be applied to many plants and plant parts for fungal control without significant injury to the plants. Thus, they can be applied to the aerial portions of growing plants to control leaf-attacking fungal organisms, dispersed in the soil to control the root-attacking organisms of mold and damping off and applied to orchard floor surfaces to control over-wintering spores of many fungal organisms. Surprisingly, certain of the new compounds give selective preemergent control of many undesirable weed plants without harming other common plants. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay. They also can be employed as a toxicant to control insect pests.

The exact concentration of the toxicant to be employed in the treating compositions is not critical and may vary considerably provided the required dosage of the effective agent is supplied in the ink, adhesive, soap, cutting oil, polymeric material, paint, textile, paper, wood or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight.

In a representative operation, each of the compounds 3-[(2,3,5,6-tetrachloro-4-pyridyl)sulfonyl]propionitrile, [(2,3,5,6-tetrachloro-4-pyridyl)sulfonyl]acetonitrile, [(2,3,5,6-tetrachloro-4-pyridyl)sulfinyl]acetonitrile and [(2,3,5-trichloro-4-pyridyl)thio]acetonitrile when employed as the sole toxicant in a nutrient agar at a concentration of about 500 parts by weight of the compound per million parts of agar is found to give 100 percent kill and control of the organisms *Pullularia pullulans* and *Aspergillus terreus*.

In additional operations at the same toxicant concentration and nutrient agar, each of the compounds [(2,3,5,6-tetrachloro-4-pyridyl)sulfonyl]acetonitrile, [(2,3,5,6-tetrachloro-4-pyridyl)sulfinyl]acetonitrile and 3-[(2,3,5,6-tetrachloro-4-pyridyl)sulfonyl]propionitrile is found to give 100 percent kill and control of the organisms *Bacillus subtilis, Candida pelliculosa, Trichophyton mentagrophytes* and *Staphylococcus aureus.*

In another representative operation employing the same toxicant concentrations, the compound [(2,3,5,6-tetrachloro-4-pyridyl)sulfinyl]acetonitrile is found to give 100 percent kill and control of the organisms *Escherichia coli, Candida albicans, Aerobacter aerogenes, Salmonella typhosa, Mycobacterion phlei* and *Rhizopus nigricans.*

In other representative operations, [(2,3,5,6-tetrachloro-4-pyridyl)sulfinyl]acetonitrile as the only active toxicant at a concentration of 500 parts per million of the ultimate composition give excellent kill and control of the American cockroach.

In other operations, 3-[(2,3,5,6-tetrachloro-4-pyridyl)-sulfonyl]propionitrile when dispersed in a commercial latex paint composition in an amount of 1.0 percent by weight of the ultimate paint composition, as the only active toxicant, and the paint applied to wood panels which are dried and thereafter exposed for one month in a tropical chamber at a relative humidity of 95 percent and a temperature of 82° F. completely prevented any mold or mildew growth.

In another operation, aqueous compositions containing one of [(2,3,5,6-tetrachloro-4-pyridyl)sulfonyl]acetonitrile and [(2,3,5,6-tetrachloro-4-pyridyl)sulfinyl]acetonitrile as the sole active toxicant, give substantially complete kills of Chlorella algae and the water plants Cabamba, and Moneywort when employed at a concentration of 10 parts per million by weight of the ultimate composition.

In other operations, aqueous compositions containing, as the sole active toxicants, one of 3-[(2,3,5,6-tetrachloro-4-pyridyl)sulfonyl]propionitrile, [2,3,5,6 - tetrachloro-4-pyridyl)sulfonyl]acetonitrile and [(2,3,5,6-tetrachloro-4-pyridyl)sulfinyl]acetonitrile at a concentration of 400 parts per million by weight of the ultimate composition give substantially complete kills of rice blast organisms.

In another operation, aqueous dispersions containing [(2,3,5,6-tetrachloro-4-pyridyl)sulfinyl]acetonitrile at a concentration of 400 parts per million by weight of the ultimate composition give substantially complete kills of the organisms apple scab fungus and lettuce downy mildew.

In other representative operations, aqueous dispersions containing [(2,3,5-trichloro-4-pyridyl)thio]acetonitrile at a concentration of 4000 parts per million by weight of the ultimate composition give complete kills of bean mildew.

In another representative operation, 3-[(2,3,5,6-tetrachloro-4-pyridyl)sulfonyl]propionitrile as the only active toxicant at a concentration of about 20 pounds per acre give substantial kills of pigweeds, meadow fesque and wild oats: [(2,3,5,6-tetrachloro-4-pyridyl)sulfonyl]acetonitrile as the only active toxicant at a concentration of 25 pounds per acre give substantial kills of pigweeds and white winter wheat and [(2,3,5,6-tetrachloro-4-pyridyl)sulfinyl]acetonitrile as the only active toxicant at a concentration of 25 pounds per acre give substantially complete kills of pigweeds, while winter wheat and wild oats.

In another operation [(2,3,5,6-tetrachloro-4-pyridyl)-sulfinyl]acetonitrile when employed as the sole toxicant at a concentration of 100 parts per million by weight of a nutrient agar composition is found to give substantially complete kills of *Rhizoctonia solani.*

PREPARATION OF STARTING MATERIALS

The alkali metal salt of the polyhalomercaptopyridine is prepared by the method of U.S. Pat. No. 3,364,223 wherein a polyhalopyridine is reacted with alkali metal sulfide at temperatures between 65° and 110° C. under ambient atmospheric pressure and in the presence of an inert organic solvent. The reaction conditions are maintained for a few hours and the product can be readily isolated from the reaction mixture by evaporation to dryness.

The halopyridyl mercaptan starting material can be prepared by acidification of the alkali metal salt prepared above with a concentrated mineral acid which converts the alkali metal salt to the corresponding —SH compound.

The halopyridyl sulfenyl halide (chloride or bromide) starting material can be prepared by reacting the above prepared halopyridyl mercaptan with a halogen (chlorine or bromine) in carbon tetrachloride whereby the —SH group of the halopyridyl mercaptan is converted to —SCl or —SBr.

The halopyridyl sulfonyl halide (chloride or bromide) starting material can be prepared by the oxidation of the above prepared halopyridyl sulfenyl halide wherein chlorine gas is added to a solution of the sulfenyl halide in carbon tetrachloride, and water or trichloro acetic acid and water at temperatures of from about 0° C. to about 60° C.

The olefinic nitriles and haloalkyl nitriles are both groups of commercially available products, the preparations of which are taught in most college chemistry texts. One such text is Wagner et al., Synthetic Organic Chemistry, chapter 20 (1956), John Wiley & Sons, Inc., N.Y.

The polyhalocyanopyridines employed as starting materials can be prepared by the method of U.S. Pat. 3,325,503 wherein cyano-substituted pyridines are chlorinated with chlorine gas in vapor phase operations employing a carbon catalyst activated with barium chloride at a temperature of about 300°–400° C. The polyhalocyanopyridine may then be converted to the bromo or fluoro or partial bromo or fluoro cyanopyridine counterparts employing known techniques of halide exchange, wherein the above-identified tetrachlorocyanopyridines and trichlorocyanopyridines are treated with gaseous hydrogen bromide in an acid medium or with potassium fluoride in a polar solvent and conveniently at the boiling temperature and under reflux.

Following the exchange, the desired product is separated by conventional procedures such as washing with water, extraction and fractional distillation.

The cyano-substituted pyridines employed to prepare the polyhalocyanopyridines are commercially available and may be prepared by the ammoxidation of methylpyridine as described in Chemical Engineering Progress, September 1964, pages 48–49.

The polyhalocarbamoyl- or carboxypyridine starting materials can be prepared by conventional controlled hydrolysis of the appropriate polyhalocyanopyridine with either an acid or base or with alkaline hydrogen peroxide.

What is claimed is:
1. The compound corresponding to the formula:

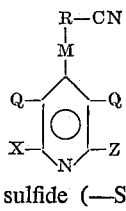

wherein M represents sulfide (—S—), sulfinyl

or sulfonyl

R is an alkyl or monohalo substituted alkyl radical having 1 or 2 carbon atoms and further characterized in that when R has 2 carbon atoms, one of the carbon atoms can have a methyl group attached thereto; X represents chlorine, bromine or fluorine; Z represents hydrogen, chlorine, bromine or fluorine; Q represents chlorine or bromine with the proviso that when X is bromine, Q is bromine and $n$ represents an integer of from 1 to 3, both inclusive.

2. The compound of claim 1 wherein M is sulfonyl and each of Q, X and Z are chlorine.

3. The compound of claim 1 wherein M is sulfinyl and each of Q, X and Z are chlorine.

4. The compound of claim 1 wherein M is sulfide and each of Q, X and Z are chlorine.

5. The compound of claim 1 wherein Z is hydrogen, each of Q and X are chlorine and M is sulfonyl.

6. The compound of claim 2 wherein R contains 2 carbon atoms.

7. The compound of claim 2 wherein R contains 1 carbon atom.

8. The compound of claim 3 wherein R contains 1 carbon atom.

9. The compound of claim 1 wherein R contains 1 carbon atom, and each of Q and X are chlorine and Z is hydrogen.

References Cited
UNITED STATES PATENTS

| | | | |
|---|---|---|---|
| 3,296,272 | 1/1967 | Johnston | 260—294.8 |
| 3,415,832 | 12/1968 | Crawford | 260—294.8 |
| 3,535,328 | 10/1970 | Zielinski | 260—294.8 X |

ALAN L. ROTMAN, Primary Examiner

U.S. Cl. X.R.

260—294.8 F, 999

PO-1050
(5/69)

UNITED STATES PATENT OFFICE
CERTIFICATE OF CORRECTION

Patent No. 3,634,436     Dated  11 January 1972

Inventor(s) Penelope B. Domenico

It is certified that error appears in the above-identified patent and that said Letters Patent are hereby corrected as shown below:

Column 6, line 74, delete "4.60" and insert --46.60--.

Signed and sealed this 11th day of July 1972.

(SEAL)
Attest:

EDWARD M. FLETCHER, JR.              ROBERT GOTTSCHALK
Attesting Officer                    Commissioner of Patents